US009304016B2

(12) United States Patent
Andreason

(10) Patent No.: US 9,304,016 B2
(45) Date of Patent: Apr. 5, 2016

(54) ENCODER DEVICE FOR OPTICAL DETECTION OF MOVEMENT OR POSITION

(71) Applicant: LEINE & LINDE AB, Straengnaes (SE)

(72) Inventor: Per Andreason, Straengnaes (SE)

(73) Assignee: LEINE & LINDE AB, Straengnaes (SE)

( * ) Notice: Subject to any disclaimer, the term of this patent is extended or adjusted under 35 U.S.C. 154(b) by 206 days.

(21) Appl. No.: 13/920,733

(22) Filed: Jun. 18, 2013

(65) Prior Publication Data

US 2013/0341499 A1    Dec. 26, 2013

(30) Foreign Application Priority Data

Jun. 18, 2012  (SE) ........................ 1250642

(51) Int. Cl.
G01D 5/34      (2006.01)
G01D 5/347     (2006.01)

(52) U.S. Cl.
CPC ............ *G01D 5/347* (2013.01); *G01D 5/34715* (2013.01)

(58) Field of Classification Search
CPC ........... G01D 5/264; G01D 5/30; G01D 5/34; G01D 5/347; G01D 5/34715
USPC ....................... 250/231.13–231.18
See application file for complete search history.

(56) References Cited

U.S. PATENT DOCUMENTS

| 4,703,176 | A | | 10/1987 | Hahn et al. |
| 5,670,781 | A | * | 9/1997 | Setbacken ................ 250/231.16 |
| 6,476,380 | B1 | | 11/2002 | Burgschat |
| 2006/0151686 | A1 | | 7/2006 | Ng et al. |

FOREIGN PATENT DOCUMENTS

EP    0 564 683    10/1993

OTHER PUBLICATIONS

European Search Report, dated Sep. 24, 2013, issued in corresponding European Patent Application No. 13169704.7.

* cited by examiner

*Primary Examiner* — Thanh Luu
(74) *Attorney, Agent, or Firm* — Kenyon & Kenyon LLP

(57) ABSTRACT

An encoder device for optical detection of movement or position includes a first terminal for delivery of an electric measurement code signal. The encoder device further includes a first printed circuit board, a detector mounted on the first printed circuit board, and a code device provided with a pattern. The detector and the code device are displaceable relative to each other, wherein the detector is adapted to generate the electric measurement code signal in dependence on the relative displacement. The detector includes at least one light-sensitive semiconductor chip having a first light-sensitive chip surface and a second chip surface on opposing sides. The first light-sensitive chip surface has a first chip contact area for an electrical connection. The encoder device further includes a second printed circuit board positioned between the detector and the code device, wherein the second printed circuit board is shaped so as to allow the passage of light from the code device to the first light-sensitive chip surface. The second printed circuit board has a first PCB contact area connected to the terminal, wherein the first PCB contact area is connected to the first chip contact area by solder, electrically conducting glue, ohmic contact, etc.

23 Claims, 8 Drawing Sheets

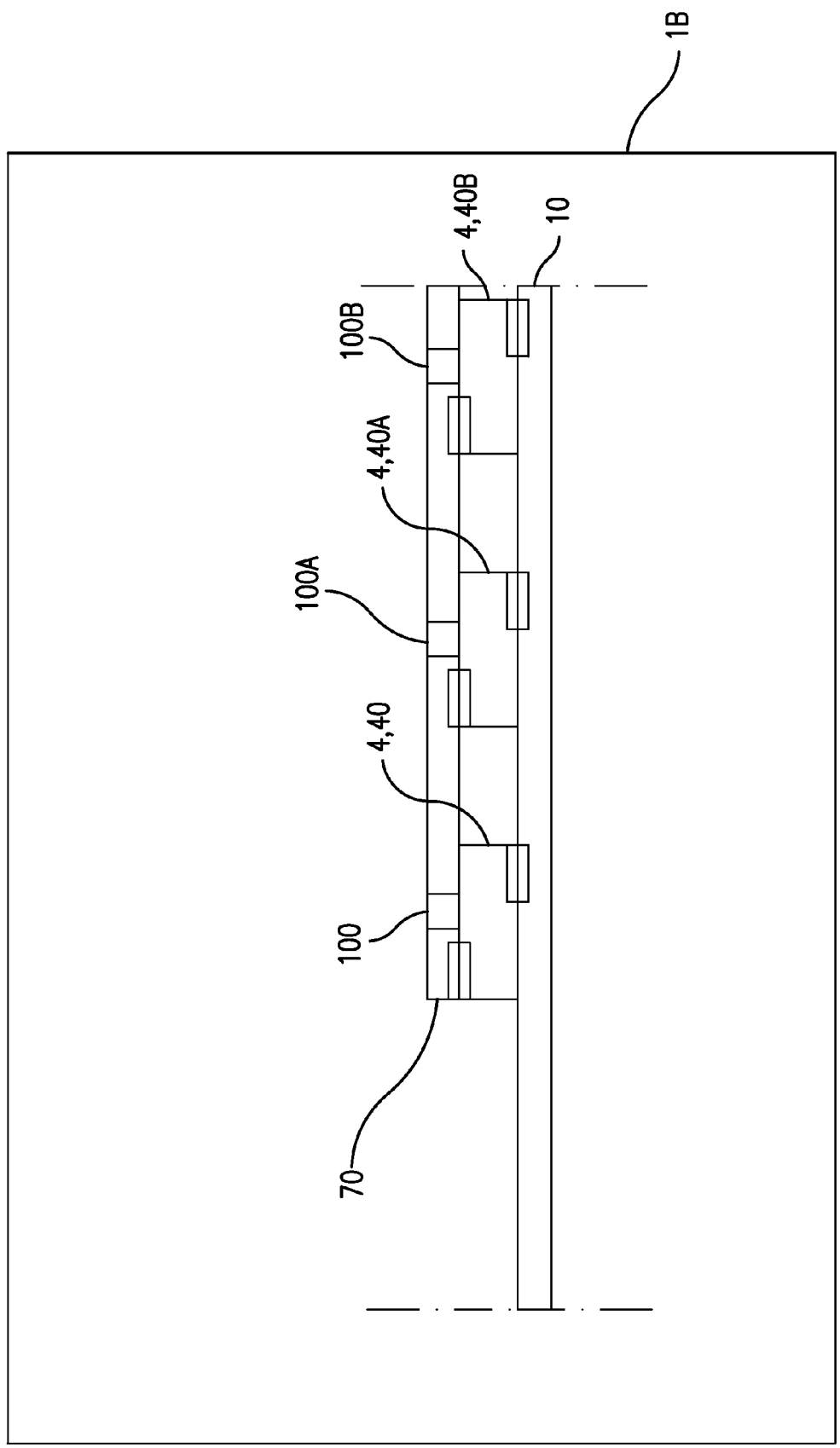

ENCODER DEVICE FOR OPTICAL DETECTION OF MOVEMENT OR POSITION

CROSS-REFERENCE TO RELATED APPLICATIONS

The present application claims priority to Application No. 1250642-4, filed in the Kingdom of Sweden on Jun. 18, 2012, which is expressly incorporated herein in its entirety by reference thereto.

FIELD OF THE INVENTION

The present invention relates to an encoder device and, in particular, to an encoder device for optical detection of movement or position.

BACKGROUND INFORMATION

A rotary encoder is an important sensor commonly used in closed loop velocity control and positioning applications within industrial applications, for example, in plants for paper or steel making in which the rotary encoder may be arranged to detect rotary movement of a machine shaft. In general, rotary encoders include a detector part which detects rotary motion and generates an electric signal corresponding to the detected angular position change. Different values, such as angular velocity and number of revolutions may be derived from the signal. There are several different types of rotary encoders, for example, optoelectrical encoders. This type of encoder includes an encoding disc that has an optically readable pattern. The disc pattern is read by one or more detectors which each deliver an electric signal in relation to the amount of light that is received in the detector, so that movement of the encoding disc in relation to the detector will be indicated by changes in the electric signal. The encoding disc includes a periodic pattern, such as a plurality of light and dark fields of mutually the same size, for instance. When the encoding disc is twisted or rotated, the change between dark and light fields can be detected and a change in angle thus determined.

The detector in the optoelectrical encoder includes a light sensitive semiconductor chip which delivers the electric signal in relation to the amount of light that is received by the light sensitive semiconductor chip. This light sensitive semiconductor chip is often mounted on a circuit board. The light sensitive semiconductor chip often has contact areas on the upper light sensitive side. In order to connect these contact areas to the circuit board on which the light sensitive semiconductor chip is mounted wire bonding is used.

Wire bonding is a common method of making interconnections between semiconductor chips and a circuit board during semiconductor device fabrication. Wire bonding must however be done in a clean room environment. Providing a clean room environment during manufacturing of encoders is expensive.

Encoders are often used in environments that are subjected to much vibration, which may cause the bond wires to come off. Vibrations or shocks may also cause mechanical contact with bond wires. These problems cause the encoder to malfunction. A faulty rotary encoder could lead to unscheduled stops of machines or plants for service or replacement of the encoder. This is disadvantageous since it leads to costly drops in production.

One way to protect against humidity and mechanical contact between the bond wires is to use silicon around the bond wires. The silicon may however move with temperature changes. This can result in that the bond wires and/or the light sensitive semiconductor come loose.

In view of the foregoing discussion, there is believed to be a need for an improved solution for the use of light sensitive semiconductor chips in encoders which solves or at least mitigates at least one of the above mentioned problems.

SUMMARY

Example embodiments of the present invention provide an encoder device for optical detection of movement or position which solves or at least mitigates at least one of the above mentioned problems.

For example, exemplary embodiments of the present invention provide an encoder device for optical detection of movement or position. The encoder device includes a first terminal for delivery of an electric measurement code signal. The encoder device further includes a first printed circuit board, a detector mounted on the first printed circuit board and a code device provided with a pattern. The detector and the code device are displaceable relative to each other, wherein the detector is arranged to generate an electric measurement code signal in dependence on the relative displacement. The detector includes at least one light-sensitive semiconductor chip having a first light-sensitive chip surface and a second chip surface on opposing sides. The first light-sensitive chip surface has a first chip contact area for an electrical connection. The encoder device further includes a second printed circuit board positioned between the detector and the code device, wherein the second printed circuit board is shaped so as to allow the passage of light from the code device to the first light-sensitive chip surface. The second printed circuit board has a first PCB contact area connected to the terminal. The first PCB contact area is connected to the first chip contact area by solder, electrically conducting glue, ohmic contact, etc.

This arrangement provides for a simple and straightforward production process of the encoder device, while the second printed circuit board also provides mechanical protection for the at least one light-sensitive semiconductor chip during use of the encoder device. Moreover, this arrangement allows for a reduced production cost, as compared to encoders including bond wires for electrical connections, since this arrangement allows for the production of the complete encoder device without the need of a costly clean room that is needed for the bonding process.

Example embodiments of the present invention provide an encoder device for optical detection of a change in the intensity of light incident from a direction of incidence. The encoder device includes a first terminal for delivery of an electric measurement code signal. The encoder device further includes a first printed circuit board and a detector mounted on the first printed circuit board. The detector is adapted to generate the electric measurement signal so that it varies in dependence on the change in light intensity. The detector includes at least one light-sensitive semiconductor chip which has a first light-sensitive chip surface and a second chip surface on opposing sides. The first light-sensitive chip surface has a first chip contact area for an electrical connection. The encoder device further includes a second printed circuit board positioned between the detector and the code device, wherein the second printed circuit board is shaped so as to allow the passage of light from the direction of incidence to the detector. The second printed circuit board has a first PCB contact area connected to the terminal, wherein the first PCB contact area is connected to the first chip contact area by solder, electrically conducting glue, ohmic contact, etc.

One aspect of example embodiments of the present invention is that there is no need for bond wires. Thus, the relative high cost of bonding may be avoided.

Furthermore, the daughter board will provide mechanical protection to photo diodes and there are no bond wires that need mechanical protection. Thus there is no need of silicon as mechanical and moisture protection.

In addition, production may be performed in normal production facilities. In other words, no clean room environment is necessary. This provides for a fast and highly automated production method.

Moreover, it is possible to place other components, such as amplifiers, etc., on the first circuit board and/or the second circuit board. This results in better signal quality from photo diode/array/light detector through having amplifier and other electronics close the photo diode itself.

In addition, soldering may be performed in one step, instead of two or more steps. This provides a better accuracy by one instead of two tolerances.

Further features and aspects of example embodiments of the present invention are described in more detail below with reference to the appended Figures.

BRIEF DESCRIPTION OF THE DRAWINGS

FIG. 7 is an assembled view of an encoder device according to an example embodiment of the present invention.

DETAILED DESCRIPTION

In the following description, for purposes of explanation and not limitation, specific details are set forth, such as device configurations in order to provide a thorough understanding of example embodiments of the present invention. It should be understood that the following description is not intended to be limiting and that other example embodiments may depart from these specific details.

Figure 1:
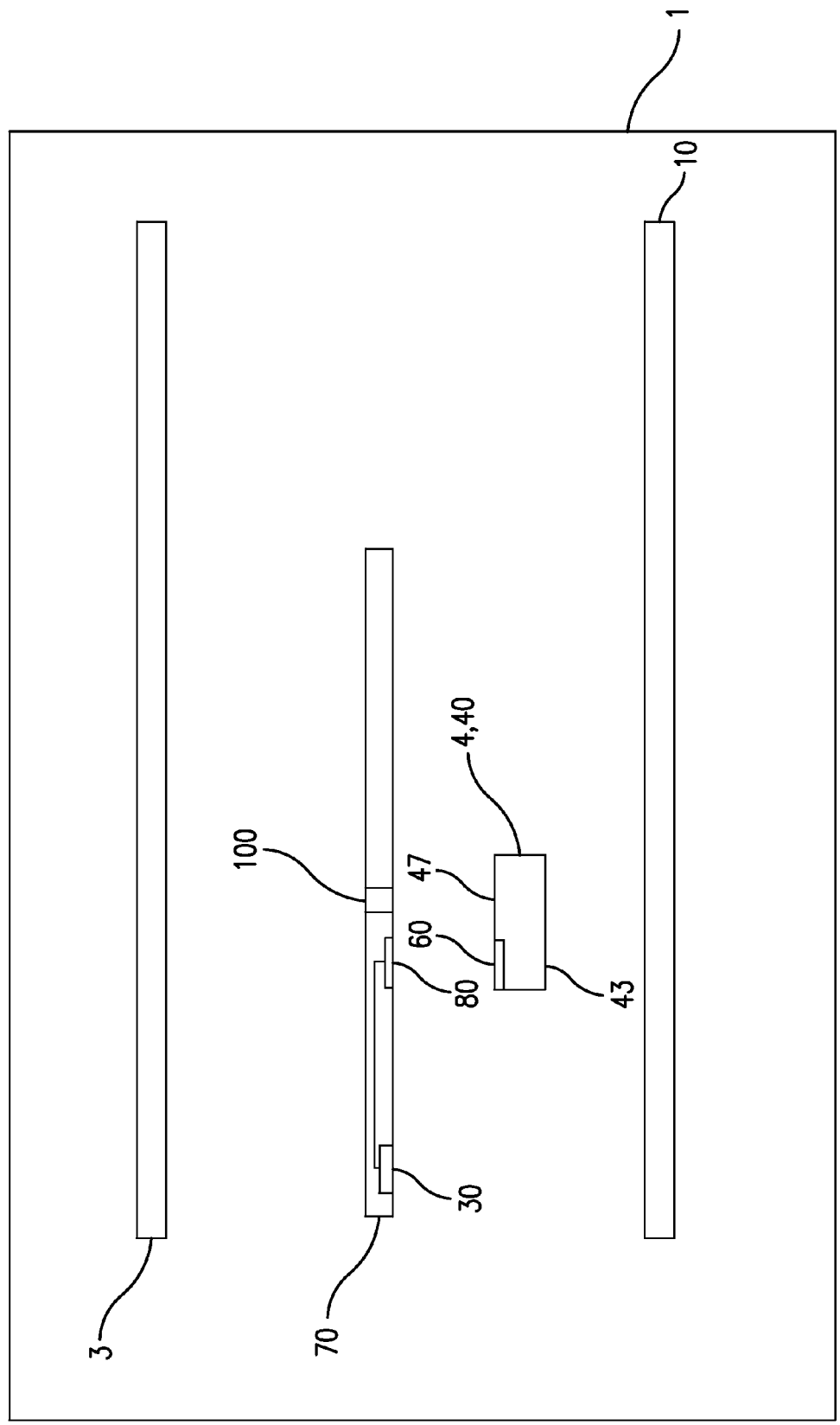
FIG. 1 is an exploded view of an encoder device according to an example embodiment of the present invention.

Referring, for example, to FIG. 1 there is illustrated an exploded view of an encoder device 1 for optical detection of movement or position, according to an example embodiment of the present invention. The encoder device 1 includes a first terminal 30 for delivery of an electric measurement code signal. A detector 4 is mounted on a first printed circuit board 10 inside the encoder device 1. The encoder device 1 further includes a code device 3 provided with a pattern. The code device 3 can be a transparent disc with a pattern that at certain points shadow light from a light source. The detector 4 and code device 3 are displaceable relative to each other. The detector 4 is disposed to generate an electric measurement code signal in dependence on the relative displacement. The detector 4 includes at least one light-sensitive semiconductor chip 40 which having a first light-sensitive chip surface 47 and a second chip surface 43 on opposing sides. The first light-sensitive chip surface 47 has at least one first chip contact area 60 for an electrical connection.

The encoder device 1 illustrated in FIG. 1 further includes a second printed circuit board 70 positioned between the detector 4 and the code device 3. The second printed circuit board 70 is shaped so as to allow the passage of light from the code device 3 to the first light-sensitive chip surface 47. In exemplary embodiments, the second printed circuit board 70 includes at least one opening 100 so as to allow the passage of light from the code device 3 to the detector 4.

A first PCB contact area 80 provided at the second printed circuit board 70 is connected to the terminal 30. The first PCB contact area 80 is connected to the first chip contact area 60 by solder, electrically conducting glue, ohmic contact, etc.

Figure 1B:
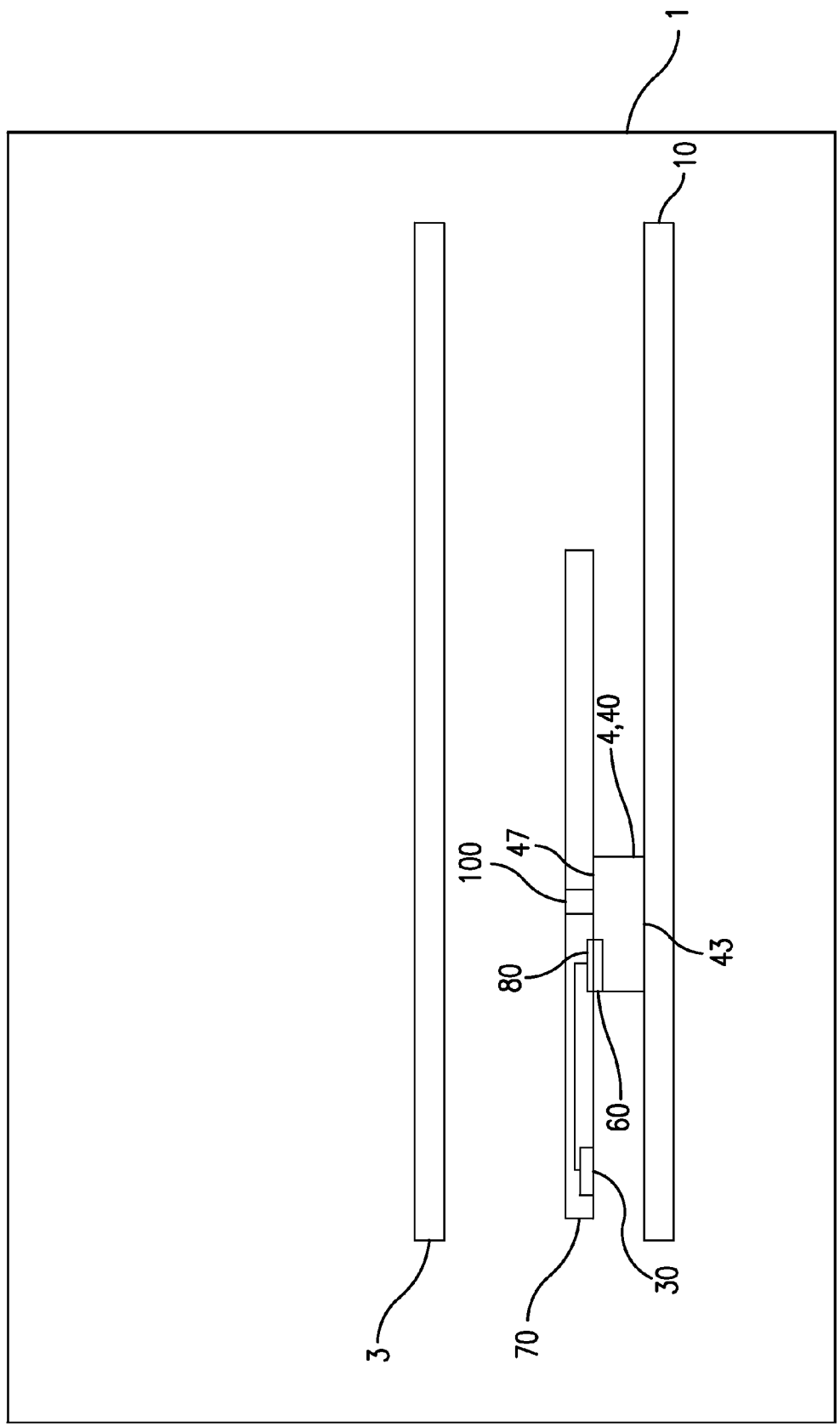
FIG. 1b is an assembled view of the encoder device illustrated in FIG. 1.

Referring to FIG. 1b there is illustrated an assembled view of the encoder device 1 illustrated in FIG. 1.

Figure 2:
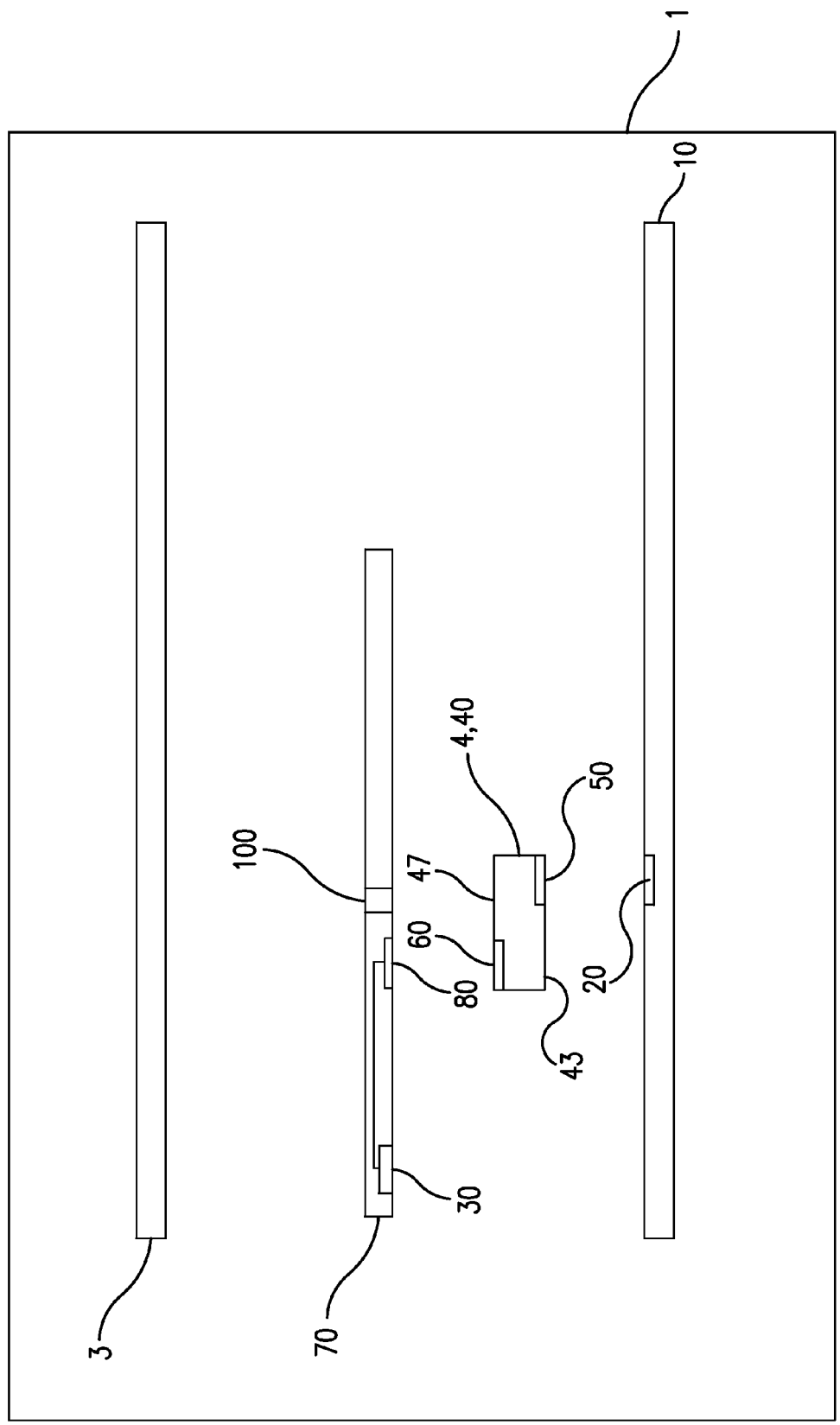
FIG. 2 is an exploded view of an encoder device according to an example embodiment of the present invention.

FIG. 2 illustrates an encoder device 1 according to an exemplary embodiment of the present invention. In this exemplary embodiment, the first printed circuit board 10 has a second PCB contact area 20 and the second chip surface 43 has a second chip contact area 50 connected to the second PCB contact area 20 by solder, electrically conducting glue, ohmic contact, etc.

Figure 3:
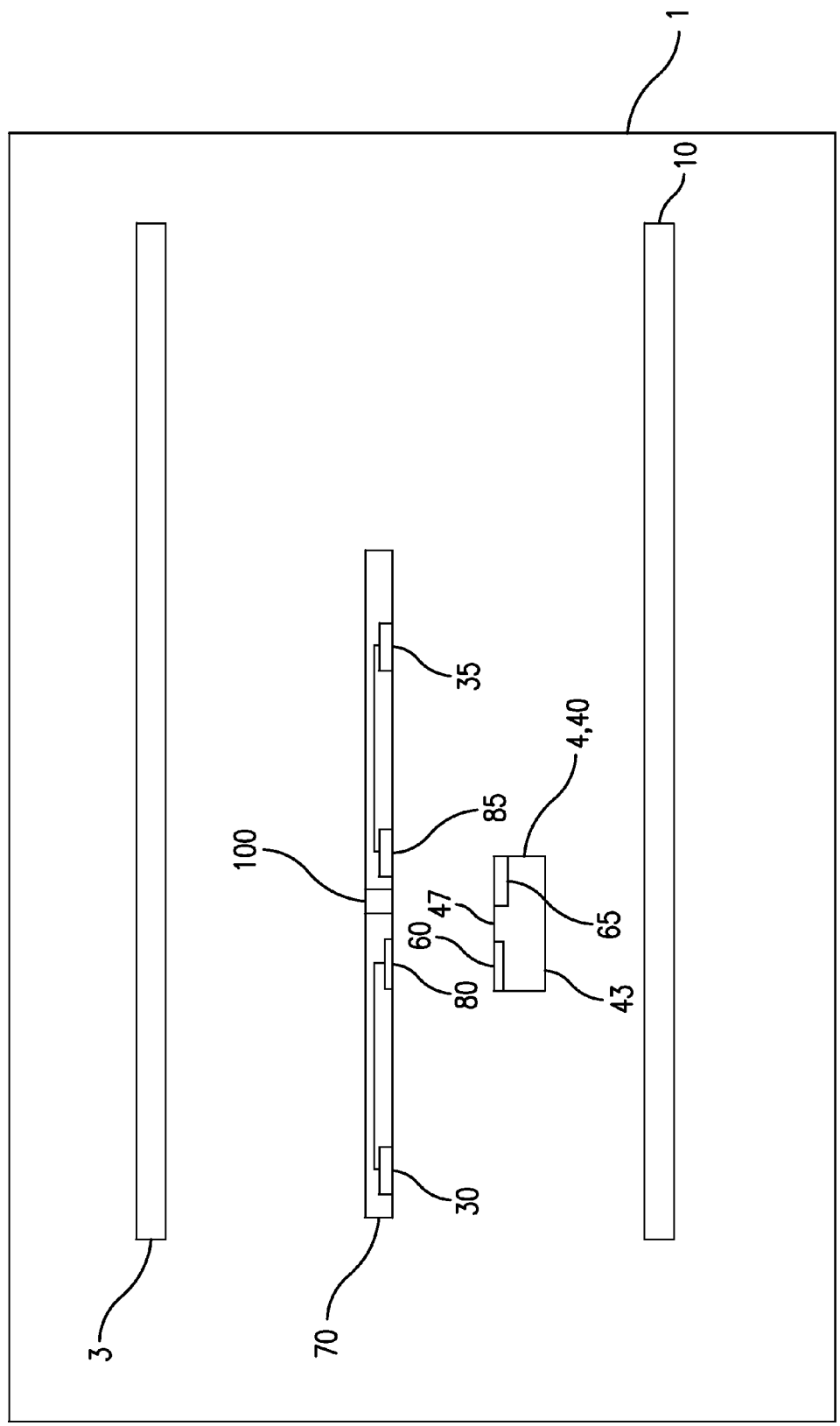
FIG. 3 is an exploded view of an encoder device according to an example embodiment of the present invention.

FIG. 3 illustrates an encoder device 1 according to an example embodiment of the present invention. In this exemplary embodiment, the second printed circuit board 70 has a second PCB contact area 85 and the first chip surface 47 has a second chip contact 65.

Figure 4:
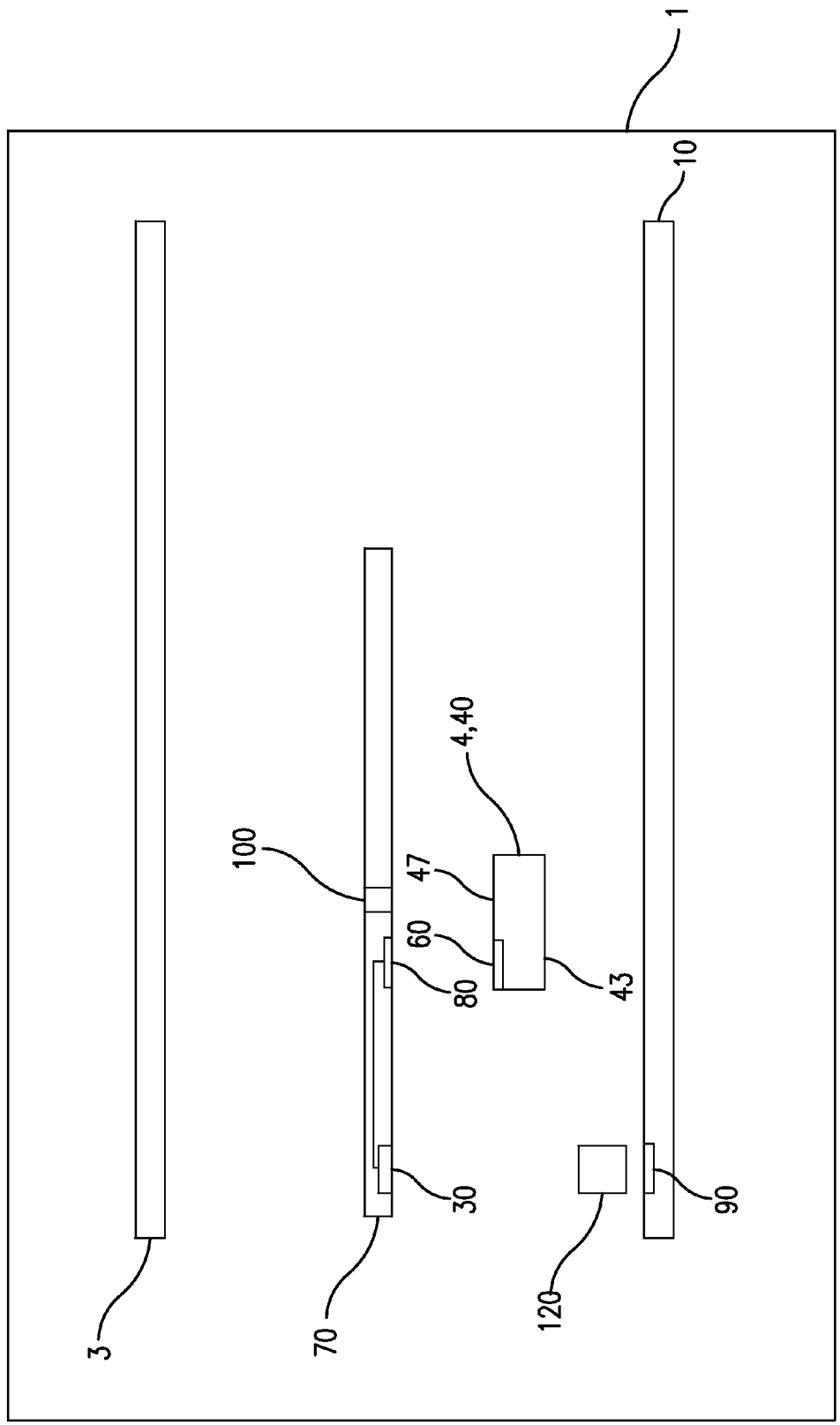
FIG. 4 is an exploded view of an encoder device according to an example embodiment of the present invention.

FIG. 4 illustrates an encoder device 1 according to an exemplary embodiment of the present invention. In this exemplary embodiment, the first printed circuit board 10 includes a second terminal 90. An electrically conductive device 120 is adapted to provide electrical connection between the second terminal 90 on the first printed circuit board 10 and the first contact area 30 on the second printed circuit board 70.

The electrically conductive device 120 may include a flexible body which has a first end which is attached to the first printed circuit board 10 with a first connection and a second end which is attached to the second printed circuit board 70 with a second connection.

In the encoder device 1, when solder is included, the solder may be substantially free from lead. Lead free soldering requires higher soldering temperature.

The encoder device 1 may include a clamping device when including at least one chip contact area 80, 20 being connected by ohmic contact to a corresponding PCB contact area 50, 60. The clamping device is adapted to provide a certain amount of pressure acting to squeeze the second printed circuit board 70 towards the first printed circuit board 10 so as to hold the detector 4 at a predetermined position between the second printed circuit board 70 and the first printed circuit board 10 such that the ohmic contact is maintained. In such an arrangement, the first printed circuit board 10 may have a shaped portion for positioning the detector 4 at the predetermined position such that the first chip contact area 50 faces the first PCB contact area 20. The first printed circuit board 10 may have at least two projections that protrude from the printed circuit board surface on which the first PCB contact area 20 is located. The at least two projections co-operate with a physical shape of the detector 4 so as to position the detector 4 at the predetermined position such that the second chip contact area 50 faces the first PCB contact area 20.

The second chip contact area 50 may be connected to the second PCB contact area 20 by solder or electrically conducting glue, and the first PCB contact area 80 may be connected to the first chip contact area 60 by ohmic contact.

The electrically conductive device 120 may be attached to the first printed circuit board 10 and to the second printed circuit board 70 by solder or electrically conducting glue such that the first printed circuit board 10 co-operates with the second printed circuit board 70 to hold the detector 4 at a predetermined position between the second printed circuit board 70 and the first printed circuit board 10 such that the ohmic contact is maintained.

The electrically conductive device 120 may include a resilient or elastic member adapted to urge the second printed circuit board 70 toward the first printed circuit board 10.

The encoder device 1 may include a light source arranged and positioned so that the code device 3 is provided in a space between the second printed circuit board 70 and the light source.

In an encoder device 1 having the light source, the second printed circuit board 70 may have at least one opening which is shaped so as to allow the passage of light to the detector 4 from a direction of incidence defined by the position of the light source, and wherein the second printed circuit board 70 has a predetermined thickness, the predetermined thickness defining a depth of at least one opening.

Figure 5:
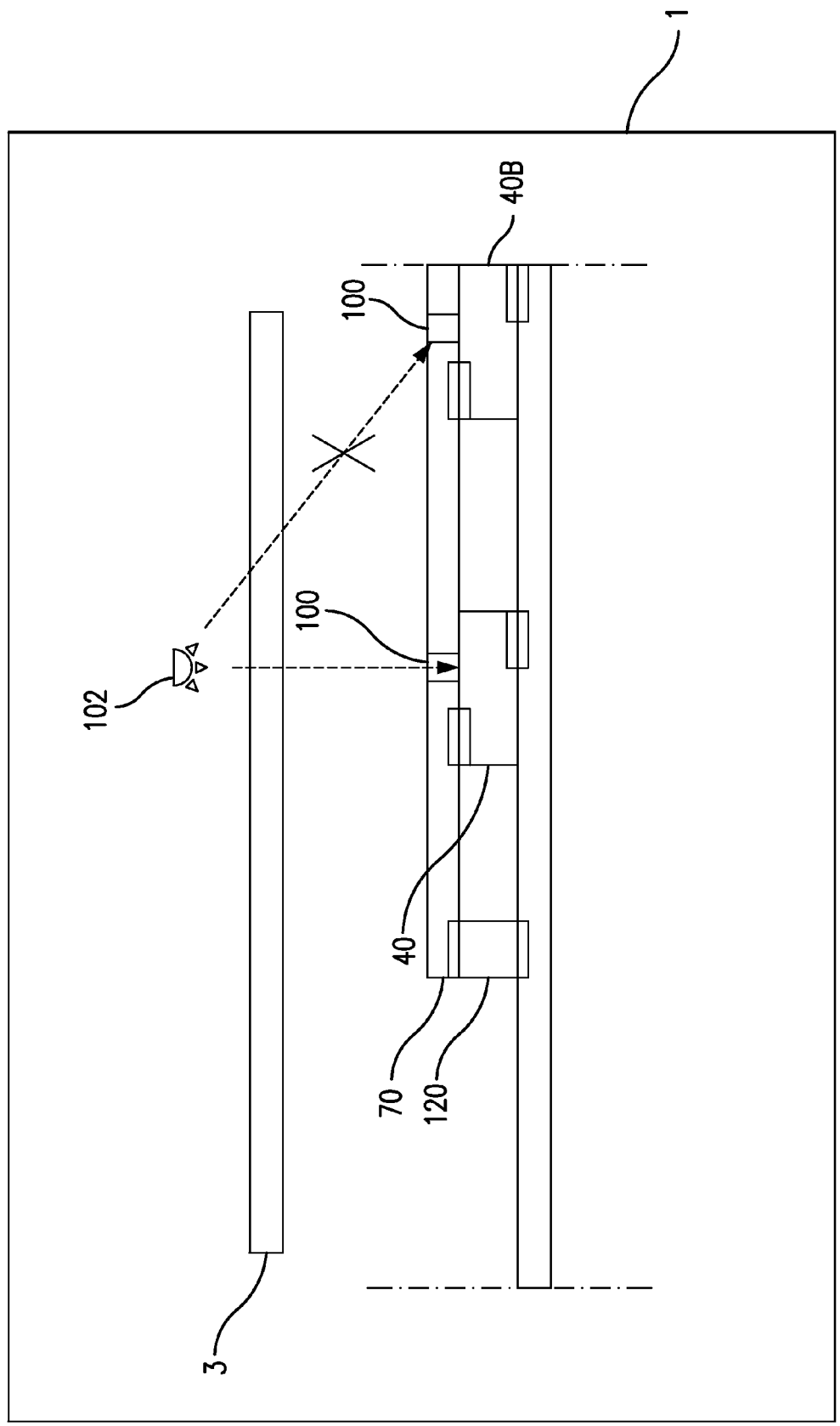
FIG. 5 is an assembled view of an encoder device according to an example embodiment of the present invention.

FIG. 5 illustrates an encoder device 1 according to an example embodiment of the present invention. In this exemplary embodiment, the encoder device includes at least a first and a second light-sensitive semiconductor chips 40, 40B adapted to generate the electric measurement code signal so that it varies in dependence on the relative displacement. The encoder device further includes at least one light source 102 arranged and positioned so that the code device is provided in a space between the second printed circuit board 70 and the light source 102. The second printed circuit board 70 has at least one opening 100 that is shaped so as to allow the passage of light to the first light-sensitive semiconductor 40. The second printed circuit board 70 has a predetermined thickness, defining a depth of the at least one opening 100 such that light from the light source 102 is shielded by the second printed circuit board 70 from reaching the second light-sensitive semiconductor chip 40B.

This arrangement may reduce or eliminate interference between code signal components originating from detector chips 40, 40B placed adjacent to each other, since this arrangement provides directivity in that the provision of appropriately shaped openings 100 in the second printed circuit board 70 shields the light. Hence, stray light is prevented from hitting the light sensitive surface of an individual chip so that the chip will receive light substantially only via a desired portion of the code device 3.

Figure 6:
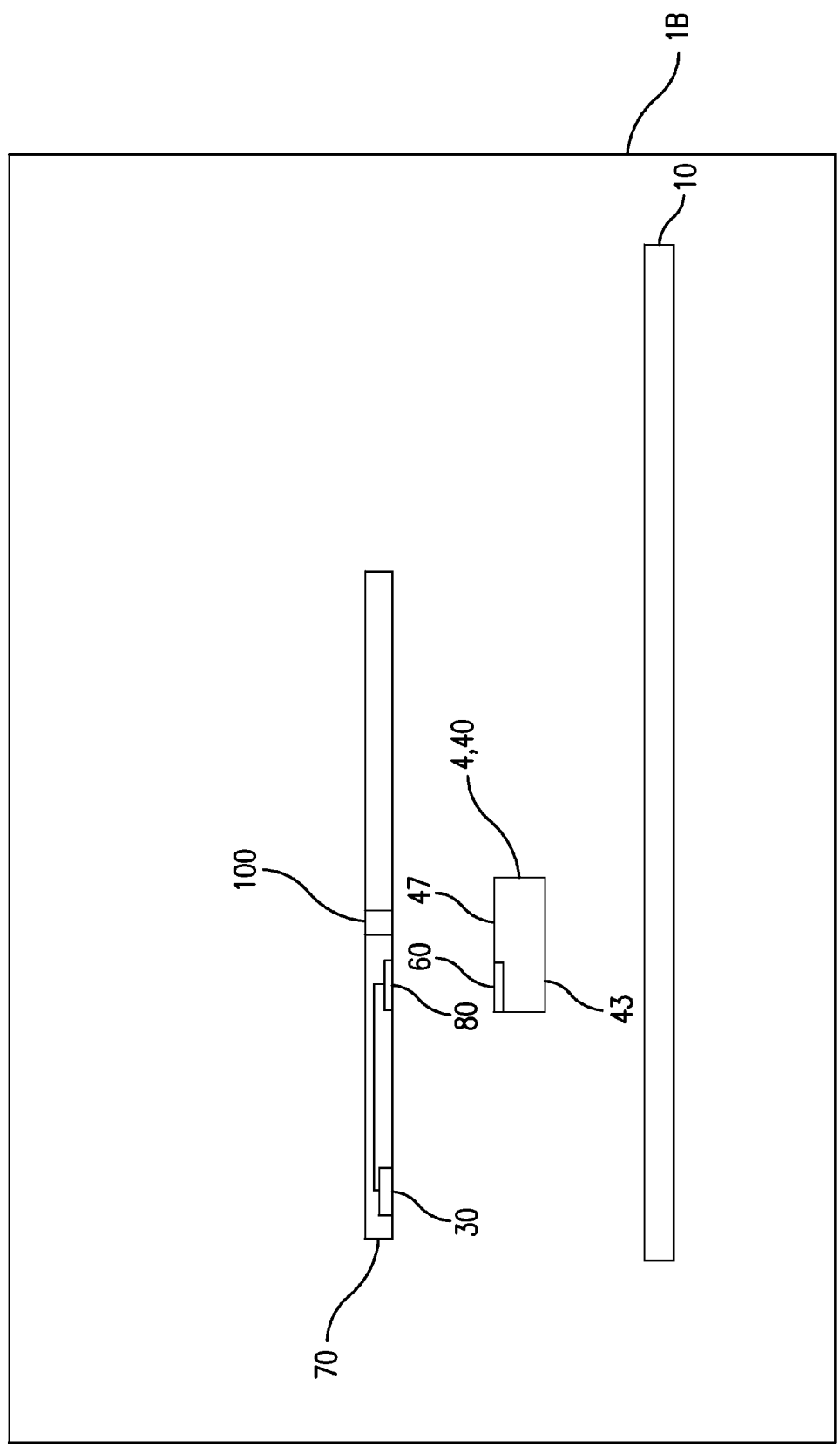
FIG. 6 is an exploded view of an encoder device according to an example embodiment of the present invention.

FIG. 6 illustrates an encoder device 1B for optical detection of a change in the intensity of light incident from a direction of incidence. As illustrated in FIG. 6, the encoder device 1B includes a first terminal 30 for delivery of an electric measurement code signal and a first printed circuit board 10. The encoder device 1B further includes a detector 4 mounted on the first printed circuit board 10. The detector 4 is adapted to generate the electric measurement signal so that it varies in dependence on the change in light intensity. The detector 4 includes at least one light-sensitive semiconductor chip 40 having a first light-sensitive chip surface 47 and a second chip surface 43 on opposing sides. The first light-sensitive chip surface 47 includes a first chip contact area 60 for an electrical connection. A second printed circuit board 70 is positioned between the detector 4 and a light source, which emits light incident from the direction of incidence, wherein the second printed circuit board 70 is shaped so as to allow the passage of light from the direction of incidence to the detector 4. The second printed circuit board 70 has a first PCB contact area 80 connected to the terminal 30, wherein the first PCB contact area 80 is connected to the first chip contact area 60 by solder, electrically conducting glue, ohmic contact, etc.

The detector 4 may include at least two light-sensitive semiconductor chips 40A, 40B. The second printed circuit board 70 may be shaped so as to allow the passage of light from the direction of incidence to one 40A of the at least two light-sensitive semiconductor chips 40A, 40B, while shielding the one 40A of the at least two light-sensitive semiconductor chips 40A, 40B from light originating from directions deviating from the direction of incidence.

In the encoder device 1B, the second printed circuit board 70 may have at least one opening 100 so as to allow the passage of light from the direction of incidence to the detector 4.

FIG. 7 illustrates an encoder device 1B according to an example embodiment of the present invention. In this exemplary embodiment, the detector 4 includes a plurality of light-sensitive semiconductor chips 40, 40A and 40B. The second printed circuit board 70 has a plurality of openings 100, 100A, 100B that are shaped so as to allow the passage of light from the direction of incidence to the plurality of light-sensitive semiconductor chips 40, 40A and 40B.

In the encoder device 1B, the first chip contact area 60 may be connected to the first PCB contact area 80 by solder or electrically conducting glue.

In a system for optical detection of a change in the intensity of light, the system includes a light source and at least one encoder device according to any of the previously described example embodiments.

What is claimed is:

1. An encoder device for optical detection of movement and/or position, comprising:
 a first terminal adapted to deliver an electric measurement code signal;
 a first printed circuit board;
 a code device including a pattern;
 a detector mounted on said first printed circuit board, the detector and the code device displaceable relative to each other, the detector adapted to generate an electric measurement code signal in accordance with relative displacement between the detector and the code device, the detector including at least one light-sensitive semiconductor chip having a first light-sensitive chip surface and a second chip surface on opposing sides, the first light-sensitive chip surface having a first chip contact area adapted for an electrical connection, the second chip surface of the light-sensitive semiconductor chip mounted on the first printed circuit board; and
 a second printed circuit board positioned between the first light-sensitive chip surface of the light-sensitive semiconductor chip and the code device;
 wherein the second printed circuit board is adapted to allow passage of light from the code device to the first light-sensitive chip surface;
 wherein the second printed circuit board includes a first PCB contact area connected to the first terminal;
 wherein the first PCB contact area is connected to the first chip contact area by solder, electrically conducting glue, and/or ohmic contact.

2. The encoder device according to claim 1, wherein the first printed circuit board includes a second PCB contact area, and the second chip surface includes a second chip contact area connected to the second PCB contact area by solder, electrically conducting glue, and/or ohmic contact.

3. The encoder device according to claim 1, wherein the second printed circuit board includes a second PCB contact area, and the first chip surface includes a second chip contact area connected to the second PCB contact area by solder, electrically conducting glue, and/or ohmic contact.

4. The encoder device according to claim 1, wherein the first printed circuit board includes a second terminal, the encoder device further comprising an electrically conductive device adapted to provide an electrical connection between the second terminal on the first printed circuit board and a second PCB contact area on the second printed circuit board.

5. The encoder device according to claim 4, wherein the electrically conductive device includes a substantially stiff body positioned between the first printed circuit board and the second printed circuit board, the electrical connection between the first printed circuit board and the second printed circuit board, via the electrically conductive device, including solder, electrically conducting glue, and/or ohmic contact.

6. The encoder device according to claim 4, wherein the electrically conductive device includes a flexible body having a first end attached to the first printed circuit board with a first connection and a second end attached to the second printed circuit board with a second connection.

7. The encoder device according to claim 1, wherein the solder is substantially free from lead.

8. The encoder device according to claim 1, wherein the second printed circuit board includes at least one opening adapted to allow passage of light from the code device to the detector.

9. The encoder device according to claim 1, wherein at least one chip contact area is connected by ohmic contact to a corresponding PCB contact area, the encoder device further comprising a clamping device adapted to provide a certain amount of pressure to squeeze the second printed circuit board toward the first printed circuit board to hold the detector at a predetermined position between the second printed circuit board and the first printed circuit board to maintain the ohmic contact.

10. The encoder device according to claim 9, wherein the first printed circuit board includes a shaped portion adapted to position the detector at the predetermined position such that the first chip contact area faces the first PCB contact area.

11. The encoder device according to claim 9, wherein the first printed circuit board includes at least two projections protruding from the printed circuit board surface on which the first PCB contact area is located, the projections co-operating with a physical shape of the detector to position the detector at the predetermined position such that the first chip contact area faces the first PCB contact area.

12. The encoder device according to claim 2, wherein the second chip contact area is connected to the second PCB contact area by solder and/or electrically conducting glue, and the first PCB contact area is connected to said first chip contact area by ohmic contact.

13. The encoder device according to claim 4, wherein the electrically conductive device is attached to the first printed circuit board and to the second printed circuit board by solder and/or electrically conducting glue such that the first printed circuit board co-operates with the second printed circuit board to hold the detector at a predetermined position between the second printed circuit board and the first printed circuit board to maintain ohmic contact.

14. The encoder device according to claim 13, wherein the electrically conductive device includes a resilient and/or elastic member adapted to urge the second printed circuit board toward the first printed circuit board.

15. The encoder device according to claim 1, further comprising a light source, the code device arranged in a space between the second printed circuit board and the light source.

16. The encoder device according to claim 15, wherein the second printed circuit board includes at least one opening adapted to allow passage of light to the detector from a direction of incidence defined by a position of the light source, the second printed circuit board having a predetermined thickness defining a depth of at least one opening.

17. The encoder device according to claim 1, wherein the detector includes at least a first and a second light-sensitive semiconductor chip adapted to generate the electric measurement code signal to vary in accordance with the relative displacement, the encoder device further comprising at least one light source, the code arranged in a space between the second printed circuit board and the light source, the second printed circuit board having at least one opening adapted to allow passage of light to the first light-sensitive semiconductor chip, the second printed circuit board having a predetermined thickness defining a depth of at least one opening such that light from the light source is shielded by the second printed circuit board from reaching the second light-sensitive semiconductor chip.

18. An encoder device for optical detection of a change in intensity of light incident from a direction of incidence, comprising:
a first terminal adapted to deliver an electric measurement code signal;
a first printed circuit board;
a detector mounted on the first printed circuit board and adapted to generate the electric measurement signal to vary in accordance with the change in light intensity, the detector including at least one light-sensitive semiconductor chip having a first light-sensitive chip surface and a second chip surface on opposing sides, the first light-sensitive chip surface having a first chip contact area for an electrical connection, the second chip surface of the light-sensitive semiconductor chip mounted on the first printed circuit board; and
a second printed circuit board arranged between the first light-sensitive chip surface of the light-sensitive semiconductor chip and a light source that is adapted to emit the light incident from the direction of incidence;
wherein the second printed circuit board is adapted to allow passage of light from the direction of incidence to the detector;
wherein the second printed circuit board includes a first PCB contact area connected to the first terminal; and
wherein the first PCB contact area is connected to the first chip contact area by solder, electrically conducting glue, and/or ohmic contact.

19. The device according claim 18, wherein the detector includes at least two light-sensitive semiconductor chips, the second printed circuit board adapted to allow passage of light from the direction of incidence to one of the light-sensitive semiconductor chips while shielding the one of the light-sensitive semiconductor chips from light originating from directions deviating from the direction of incidence.

20. The device according claim 19, wherein the second printed circuit board includes at least one opening adapted to allow passage of light from the direction of incidence to the detector.

21. The device according claim 18, wherein the detector includes a plurality of light-sensitive semiconductor chips, the second printed circuit board including a plurality of openings adapted to allow passage of light from the direction of incidence to the light-sensitive semiconductor chips.

22. The device according claim 18, wherein the first chip contact area is connected to the first PCB contact area by solder and/or electrically conducting glue.

23. A system for optical detection of a change in intensity of light, comprising:
- a light source; and
- an encoder device adapted for optical detection of a change in intensity of light incident from a direction of incidence, including:
  - a first terminal adapted to deliver an electric measurement code signal;
  - a first printed circuit board;
  - a detector mounted on the first printed circuit board and adapted to generate the electric measurement signal to vary in accordance with the change in light intensity, the detector including at least one light-sensitive semiconductor chip having a first light-sensitive chip surface and a second chip surface on opposing sides, the first light-sensitive chip surface having a first chip contact area for an electrical connection, the second chip surface of the light-sensitive semiconductor chip mounted on the first printed circuit board;
  - a code device; and
  - a second printed circuit board arranged between the first light-sensitive chip surface of the light-sensitive semiconductor chip and the code device;
  - wherein the second printed circuit board is adapted to allow passage of light from the direction of incidence to the detector;
  - wherein the second printed circuit board includes a first PCB contact area connected to the first terminal; and
  - wherein the first PCB contact area is connected to the first chip contact area by solder, electrically conducting glue, and/or ohmic contact.

* * * * *